United States Patent
Hucik et al.

(10) Patent No.: US 9,106,676 B1
(45) Date of Patent: Aug. 11, 2015

(54) GRID-BASED SERVER MESSAGING INFRASTRUCTURE

(71) Applicant: CA, Inc., Islandia, NY (US)

(72) Inventors: Robert Hucik, Simi Valley, CA (US); Beau Croteau, Bay Shore, NY (US)

(73) Assignee: CA, Inc., New York, NY (US)

( * ) Notice: Subject to any disclaimer, the term of this patent is extended or adjusted under 35 U.S.C. 154(b) by 216 days.

(21) Appl. No.: 13/788,831

(22) Filed: Mar. 7, 2013

(51) Int. Cl.
*G06F 15/16* (2006.01)
*H04L 29/08* (2006.01)

(52) U.S. Cl.
CPC ......... *H04L 67/1097* (2013.01); *H04L 67/1002* (2013.01); *H04L 67/1008* (2013.01); *H04L 67/1014* (2013.01); *H04L 67/1029* (2013.01)

(58) Field of Classification Search
CPC ............ H04L 67/1008; H04L 67/1029; H04L 67/1014; H04L 67/1002
USPC .......... 709/200–203, 217–227, 228; 718/105, 718/104
See application file for complete search history.

(56) References Cited

U.S. PATENT DOCUMENTS

| | | | |
|---|---|---|---|
| 7,024,580 B2 * | 4/2006 | Guimbellot et al. | 714/1 |
| 7,284,146 B2 * | 10/2007 | Guimbellot et al. | 714/1 |
| 7,321,926 B1 * | 1/2008 | Zhang et al. | 709/220 |
| 7,421,497 B2 * | 9/2008 | Rosenbach et al. | 709/225 |
| 7,543,020 B2 * | 6/2009 | Walker et al. | 709/203 |
| 7,584,262 B1 * | 9/2009 | Wang et al. | 709/217 |
| 8,046,458 B2 * | 10/2011 | Rosenbach et al. | 709/225 |
| 8,090,868 B2 * | 1/2012 | Kodama et al. | 709/235 |
| 8,560,693 B1 * | 10/2013 | Wang et al. | 709/226 |
| 2004/0243706 A1 * | 12/2004 | Rosenbach et al. | 709/225 |
| 2009/0187660 A1 * | 7/2009 | Kodama et al. | 709/226 |

* cited by examiner

*Primary Examiner* — Moustafa M Meky
(74) *Attorney, Agent, or Firm* — Myers Bigel Sibley & Sajovec, P.A.

(57) ABSTRACT

In a distributed computing system, respective indications of services or functionalities provided by computing nodes of the distributed computing system are received from the computing nodes. The computing nodes are registered according to the functionalities provided thereby responsive to receiving the respective indications therefrom. A request associated with one of the services is selectively communicated to at least one of the computing nodes responsive to registration thereof. Related methods, systems, and computer program products are also discussed.

18 Claims, 5 Drawing Sheets

| CH 1 | APP1 | NODE A, NODE B |
| CH2 | APP2 | NODE A, NODE B, NODE C |
| CH3 | APP3 | NODE C |

GRID-BASED SERVER MESSAGING INFRASTRUCTURE

BACKGROUND

The present disclosure relates to computing systems, and in particular to distributed computing systems.

Distributed computing systems, such as grid-based computing systems, may include multiple physical and/or virtual (e.g., cloud) computing systems, each of which defines a computing node in a communication network. The networked nodes may interact with each other in order to achieve a common goal. For example, in a grid-based computing system, a problem may be divided into multiple non-interactive tasks, and each of the tasks may be performed by one or more of the different computers that define the nodes of the network. The nodes may include servers, network storage devices, routers, gateways, communication links, software (e.g., applications, operating systems, web services, etc.), and/or other devices. The nodes may communicate with each other by passing messages via the network. The nodes may function as clients, servers, or peers, where peers can function as clients or servers.

In such node-based computing environments, it may be desirable to allow for management of both physical and virtual network nodes. Management can include updating software, adding users, etc. For example, in distributed computing systems, the nodes of the network may not be permanent, and each node may have limited knowledge of one another. As such, it may be desirable to enable nodes to further communicate with each other, for example, to share information, such as requests for code, objects, knowledge, etc.

BRIEF SUMMARY

Systems, methods and computer program products for managing computing nodes in a distributed computing system are disclosed.

According to an embodiment described herein, in a method for communication between computing nodes in a distributed computing system, respective indications of services or functionalities provided by the computing nodes are received from the computing nodes. The computing nodes are registered with the distributed computing system according to the services provided thereby responsive to receiving the respective indications therefrom. A request associated with one of the services is selectively communicated to at least one of the computing nodes responsive to registration thereof.

In an embodiment, the computing nodes may each include an independently operable processing unit. The request may be one of a plurality of requests specifying respective tasks that, when performed by one or more of the computing nodes, collectively address a common goal.

In an embodiment, the respective indications of the functionalities may be received at or provided to a shared data repository that is accessible to the computing nodes. For example, respective data storage spaces of the computing nodes may collectively define the shared data repository, and may be addressed as a logically shared address space. The request may be provided to ones of the computing nodes that are configured to provide the one of the functionalities.

In an embodiment, the request may be provided to the shared data repository for retrieval by the ones of the computing nodes.

In an embodiment, respective responses to the request may be received from respective service agents installed in the ones of the computing nodes, where each of the service agents may be associated with the one of the functionalities. However, responses may not be received from ones of the computing nodes that are not configured to provide the one of the functionalities.

In an embodiment, the shared data repository may be accessible to the respective service agents. For example, the respective responses may be received from the respective service agents at the shared data repository.

In an embodiment, the ones of the computing nodes that provide the one of the services may be logically grouped in a same communication channel, and the request may be selectively addressed to the ones of the computing nodes that provide the one of the services using the communication channel. For example, respective configuration files of service agents installed in the ones of the computing nodes may be populated with a same channel parameter that indicates the communication channel, and the request may be transmitted to the service agents having the channel parameter in the respective configuration files thereof.

In an embodiment, the respective indications of services may be received from respective agents, such as grid controller agents and/or service agents, installed in the computing nodes. The agents may be communicatively coupled to a grid controller implemented at one of the computing nodes designated as a master node. The shared data repository may be accessible to the agents.

In an embodiment, a script including computer readable program code that is interpretable by the grid controller may be received, for example, from an external source. The request may be generated responsive to interpreting the script.

In an embodiment, the computer readable code interpretable by the grid controller may include additional computer readable code configured to provide an update or an additional function that is different from or otherwise not provided by the functionalities of the computing nodes, and the request may be a request to perform the function or update. The additional computer readable program code may be distributed to ones of the computing nodes responsive to interpretation of the computer readable code by the grid controller, for example, to add or remove functionality from one or more of the computing nodes.

In an embodiment, one of the computing nodes may be designated as a master node. For example, the master node may be configured to synchronize or otherwise manage the shared data repository. A specification of the one of the computing nodes as a master node may be received from another of the computing nodes, and the another of the computing nodes may be registered with the distributed computing system responsive to receiving the specification of the master node therefrom.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
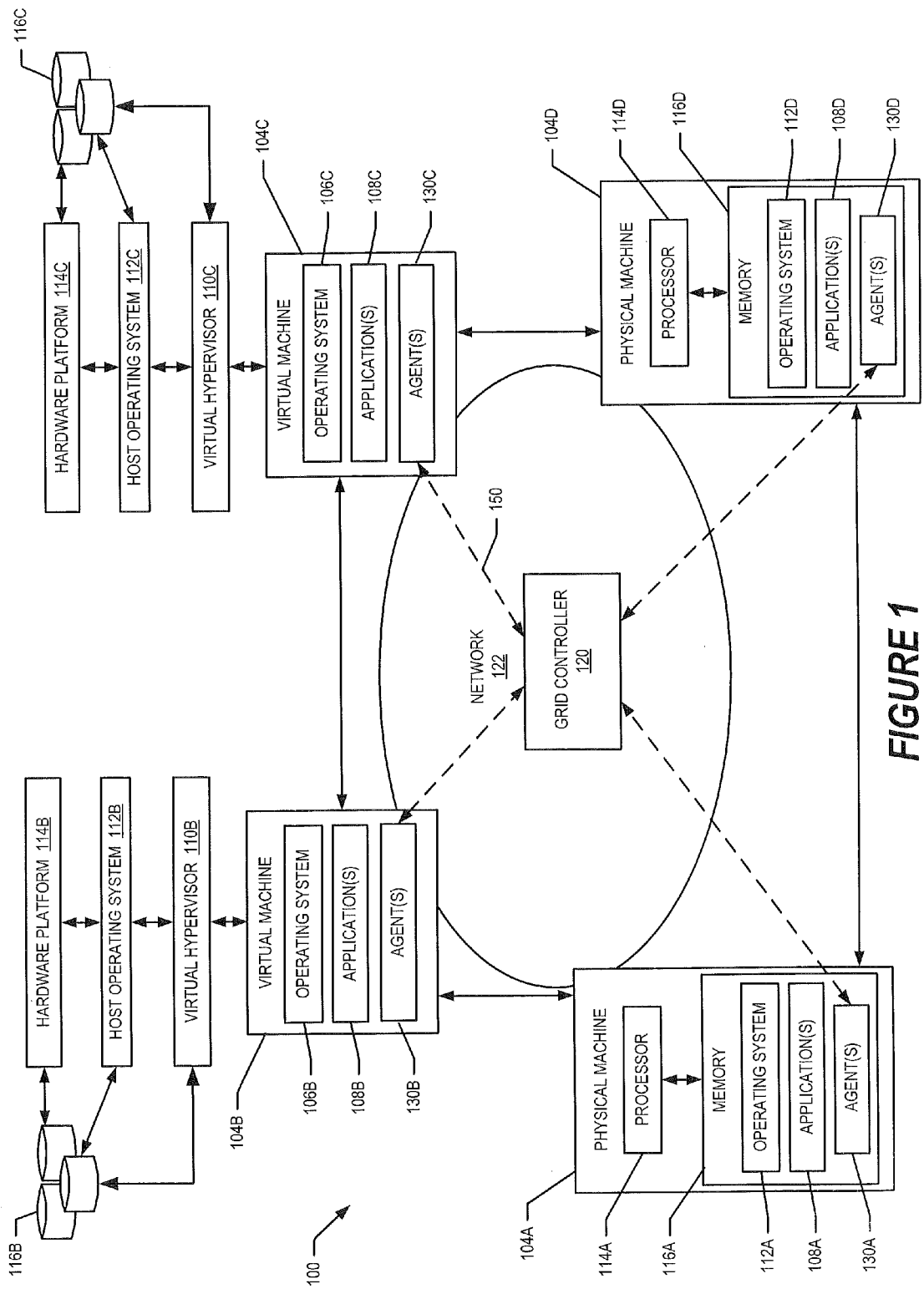
FIG. 1 is a block diagram illustrating a computing environment that supports a messaging infrastructure for communication between computing nodes in a distributed computing system in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented by entirely hardware, entirely software (including firmware, resident software, micro-code, etc.) or a combined software and hardware implementation that may all generally be referred to herein as a "circuit," "module," "component," "processor," or "system," Furthermore, aspects of the present disclosure may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Elements described as being "to" perform such functions/acts/operations may be configured to or otherwise structured to do so.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing environments described herein may refer to a virtualized environment (such as a cloud environment) and/or a physical environment. Computing nodes described herein may be defined by physical or virtual machines (VMs). Also, as described herein, a service or computing service refers to a functionality provided by a computing node and/or an application associated with or hosted by the node. A script refers to computer readable program code that is configured to be interpreted and/or executed to automate execution of tasks. The script may be written in an interpreted language and/or a dynamic programming language.

Some embodiments of the present disclosure provide a space-based and/or grid-based computing paradigm based on tuple spaces for peer-to-peer communication between nodes of a network. In particular, some embodiments of the present disclosure provide a messaging infrastructure, also referred to herein as Server Message Infrastructure (SMI), which is a grid-based computing platform that leverages space-based computing paradigms to coordinate work between many computer nodes in a distributed computing system. The messaging infrastructure provides a complete scriptable environment for programmatic control of nodes within the grid. The messaging infrastructure also provides basic software delivery features and is fully extensible for multiple tasks. For example, the messaging infrastructure according to some embodiments of the present disclosure may include (but is not limited to) the following capabilities: grid computing, coordination language (tuple spaces), node management (physical and virtual), distributed update delivery (software delivery), custom agents, encapsulation of integration domain knowledge, and programmatic grid control. Systems according to embodiments of the present disclosure can thus provide a distributed delivery mechanism with the ability to push code up and down to various nodes in response to requests, which may be generated based on scripts. The grid can operate on channels on which the requests and responses are communicated between the nodes of the grid.

FIG. 1 is a block diagram illustrating an example computing environment 100 for coordinating operations of the nodes of a distributed computing system in accordance with an embodiment of the present disclosure. As shown in FIG. 1, the computing environment 100 includes a plurality of physical and/or virtual machines 104A-104D, which define computing nodes of a network 122. The network 122 is illustrated in FIG. 1 as having an underlying ring-type topology, in which each of the nodes 104A-104D is communicatively coupled to two other nodes by respective point-to-point links; however, it will be understood that embodiments of the present disclosure are not limited to a specific network topology, and that other topologies (for example, bus, mesh, line, and/or hybrid topologies) may also be used.

The computing environment 100 is a distributed computing system, where the nodes 104A-104D are autonomous, independently operable processing units that are cooperatively deployed to perform respective tasks (also referred to as workload sharing) to collectively address a common goal. In some embodiments, the computing environment 100 may be a grid-based computing environment, where nodes 104A-104D from multiple administrative domains each performs a portion of a task that is divided into several non-interactive workloads. The nodes 104A-104D of the grid may include multiple computers of a same class that are clustered together. The nodes 104A-104D communicate using message passing protocols, allowing for parallel computing to accomplish the various portions of the task. The nodes 104A-104D may be loosely coupled, heterogeneous, and/or geographically dispersed, and may function as clients, servers, or peers. As the nodes 104A-104D are independently operable (for example, according to a space-based architecture), processing ability can be scaled by adding or removing nodes to or from the grid 100. Accordingly, the computing needs of users (e.g., humans and/or other virtual/non-virtual machines) may drive the functionality and/or quantity of the nodes 104A-104D in the network 122.

In the example of FIG. 1, the nodes 104A-104D are implemented by physical machines 104A and 104D and virtual machines 104B and 104C. The virtual machines 104B, 104C run a guest operating system 106B, 106C and one or more applications 108B, 108C. The virtual machines 104B, 104C present a virtualized environment to the guest operating systems 106B, 106C, which in turn provide an operating environment for applications 108B, 108C and other software constructs. A virtual hypervisor 110B, 110C can provide an interface between each virtual machine 104B, 104C and its host operating system 112B, 112C, and can allow multiple guest operating systems and associated applications to run concurrently. The host operating system 112B, 112C handles the operations of a hardware platform 114B, 114C, creating an environment for implementing or "hosting" each of the "guest" virtual machines 104B, 104C. Each host operating system 112B, 112C may be capable of implementing multiple isolated virtual machines simultaneously.

Besides acting as a host for computing applications that run on the hardware platform 114B, 114C, the host operating systems 112B, 112C may operate at the highest priority level in the system 100, executing instructions associated with the hardware platform 114B, 114C, and may have exclusive privileged access to the hardware platform 114B, 114C, The priority and privileged access of hardware resources affords the host operating system 112B, 112C exclusive control over resources and instructions, and may preclude interference with the execution of different application programs or the operating system.

A data storage space 116B, 116C may be accessed by the host operating system 112B, 112C and is connected to the hardware platform 114B, 114C for each of the virtual machines 104B, 104C. Similarly, the physical machines 104A, 104D each include a data storage space or memory 116A, 116D that is connected to a processor 114A, 114D. The memory 116A, 116D stores an operating system 112A, 112D and one or more applications 108A, 108D.

As such, one or more of the nodes 104A-104D may include, without limitation, a mainframe computer platform, personal computer, mobile computer (e.g., tablet computer), server, wireless communication terminal (e.g., cellular data terminal), or any other appropriate program code processing hardware. The nodes 104A-104D may include computer resources such as a processing hardware (e.g., central processing unit, CPU); networking controllers; communication controllers; a display unit; a program and data storage device; memory controllers; input devices (such as a keyboard, a mouse, etc.) and output devices such as printers. The processing hardware 114A-114D may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The data storage spaces 116A-116D may include any suitable devices capable of storing computer-readable data and program code, as well as logic in the form of software applications, random access memory (RAM), or read only memory (ROM), removable media, or any other suitable memory component. In addition, according to some embodiments described herein, one or more of the data storage spaces 116A-116D may collectively define a shared data repository, where the physically separate data storage spaces 116A-116D can be addressed as one logically shared address space. Accordingly, one or more of the data storage spaces 116A-116D may define a tuple space or shared "blackboard," which the nodes 104A-104D may access concurrently or in parallel to provide and/or retrieve requests to coordinate work therebetween. This shared repository may be synchronized and/or otherwise managed by one of the nodes 104A-104D, which may be designated as a master node.

Still referring to FIG. 1, the nodes 104A-104D each include one or more agents 130A-130D installed therein. In particular, embodiments of the present disclosure provide an infrastructure where the nodes 104A-104D of a distributed computing system 100 are connected by a grid controller 120, which communicates with the nodes 104A-104D via their installed agents 130A-130D over communication channels 150. It will be understood that, although illustrated as a separate element, the grid controller 120 may be implemented at one of the nodes 104A-104D, for example, via a corresponding one of the installed agents 130A-130D.

The controller 120 includes an interpreter which can be used to write and execute scripts to control the operations of the nodes 104A-104D. In particular, the grid controller 120 may generate a request to control operations of one or more of the nodes 104A-104D responsive to receiving and interpreting a script. The script may specify an operation to be performed or a service to be provided by one(s) of the nodes 104A-104D. Additionally or alternatively, the script may include computer program code that provides an additional functionality, which is not otherwise provided by the nodes 104A-104D, or removes functionality that is currently provided by one or more of the nodes 104A-104D. The controller 120 may distribute this code to one(s) of the nodes 104A-104D to add (or conversely, remove) functionality, by providing the appropriate request. The controller 120 thus provides a scriptable environment in which scripts can be received and processed to automate execution of tasks by the nodes 104A-104D of the grid 100. As such, the controller 120 allows for full programmatic control of the operations of the system 100.

The agents 130A-130D each encapsulate a set of actions or functions associated with one of the applications 108A-108D provided by the node 104A-104D on which they are installed, and listen on the channels 150, awaiting requests from the controller 120. For example, the agents 130A-130D may be configured to access the shared data repository or "blackboard" defined by the data storage spaces 116A-116D, which may be used by the controller 120 to provide requests to the nodes 104A-104D. The agents 130A-130D may thereby pull applicable requests from the shared data repository, and may likewise use the shared repository to update the controller 120 as to the status and/or capabilities of their respective nodes 104A-104D. The controller 120 may also designate one of the nodes 104A-104D as a master node to manage the synchronization of the shared repository. The controller 120 may include one or more middleware components for handling communication and managing data between the nodes 104A-104D.

In some embodiments, the controller 120 may be configured to selectively communicate with particular ones of the nodes 104A-104D based on the functionalities provided by the respective applications 108A-108D. For example, the controller 120 may logically group ones of the agents 130A-130D into different communication channels based on the applications 108A-108D or other capabilities associated with the respective nodes 104A-104D on which they are installed, such that ones of the nodes 104A-104D having like resources are encapsulated in a same communication channel, allowing for selective addressing of agents. The controller 120 may thus selectively address requests to the desired nodes 104A-104D to assign tasks and/or otherwise control the operations thereof using the corresponding channel.

The controller 120 may also utilize the underlying ring-based architecture to provide active/passive failover functionality by providing a fully redundant instance of each of the nodes 104A-104D, which may be brought online when its associated primary node fails. For example, the active/passive failover can provide the facilities to have all of the nodes 104A-104D become backups of each other. The controller 120 may also be configured to provide a bridging option. For example, one of the nodes 104A on the network 122 may have a public facing interface, while the other nodes 104B-104D may be connected to node 104A to define an intranet. The controller 120 may thereby use the bridge functionality to connect node 104A to another grid in the cloud, thereby connecting the cloud-based grid to the intranet.

Figure 2:
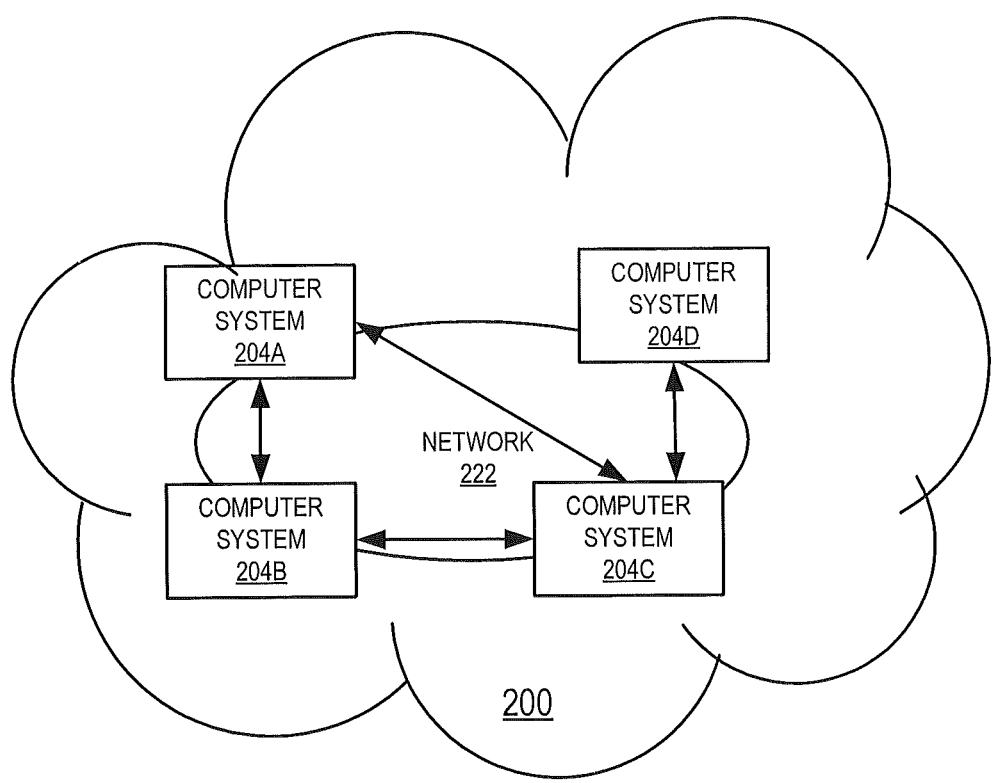
FIG. 2 is a block diagram illustrating a physical layout of a computing environment in accordance with an embodiment of the present disclosure.

FIG. 2 illustrates an example of a physical layout of a computing environment in accordance with embodiments of the present disclosure. Referring now to FIG. 2, a computing environment 200 (referred to generally as cloud 200) may include one or more computer systems 204A-204D that define nodes of a network 222. The computer systems 204A-204D may include one or more electronic computing devices, such as one or more managed machines that are operable to receive, transmit, process, and store data. For example, the systems 204A-204D may include one or more general-purpose personal computers, workstations, server computers, server pools, or any other suitable devices that are configured to perform operations to provide one or more computing services. Each of the computer systems 204A-204D may also include one or more agents (such as the agents 130A-130D illustrated in FIG. 1). The agents can be installed in each server and/or in one or more managed machines that are running on a server. In certain embodiments, the cloud 200 may include a web server. In short, the cloud 200 may include any suitable combination of software, firmware, and hardware.

As shown in FIG. 2, the systems 204A-204D are communicatively coupled via a network 222. The network 222 facilitates wireless or wireline communication, and may communicate using, for example, IP packets, Frame Relay frames, Asynchronous Transfer Mode (ATM) cells, voice, video, data, and other suitable information between network addresses. The network 222 may include one or more local area networks (LANs), radio access networks (RANs), metropolitan area networks (MANS), wide area networks (WANs), all or a portion of the global computer network known as the Internet, and/or any other communication system or systems at one or more locations.

Still referring to FIG. 2, the systems 204A-204D of the network 222 are arranged in a mesh-type topology, in which some of the systems 204A-204D are communicatively coupled to more than one other system by a point-to-point link. Data may be transmitted between the systems 204A-204D in the network 212 using a shortest path, or using alternative paths (for example, in case of a failure or break in one or more of the point-to-point links). The systems 204A-204D may also be implemented to provide active/passive failover functionality, by harnessing redundant computers in groups or clusters that provide continued service when one or more system components fail. It will be understood, however, that the network 222 is illustrated with reference to a partial mesh-type network topology by way of example, and that messaging infrastructures in distributed computing systems in accordance with embodiments of the present disclosure may use other network topologies or architectures, such as ring (as shown in FIG. 1), bus, line, tree, and/or other mesh-type topologies, and/or hybrid-type topologies use a combination of two or more of such topologies. Also, while illustrated with reference to four nodes 204A-204D by way of example, it will be understood that fewer or more nodes may be used.

Figures 3A, 3B:
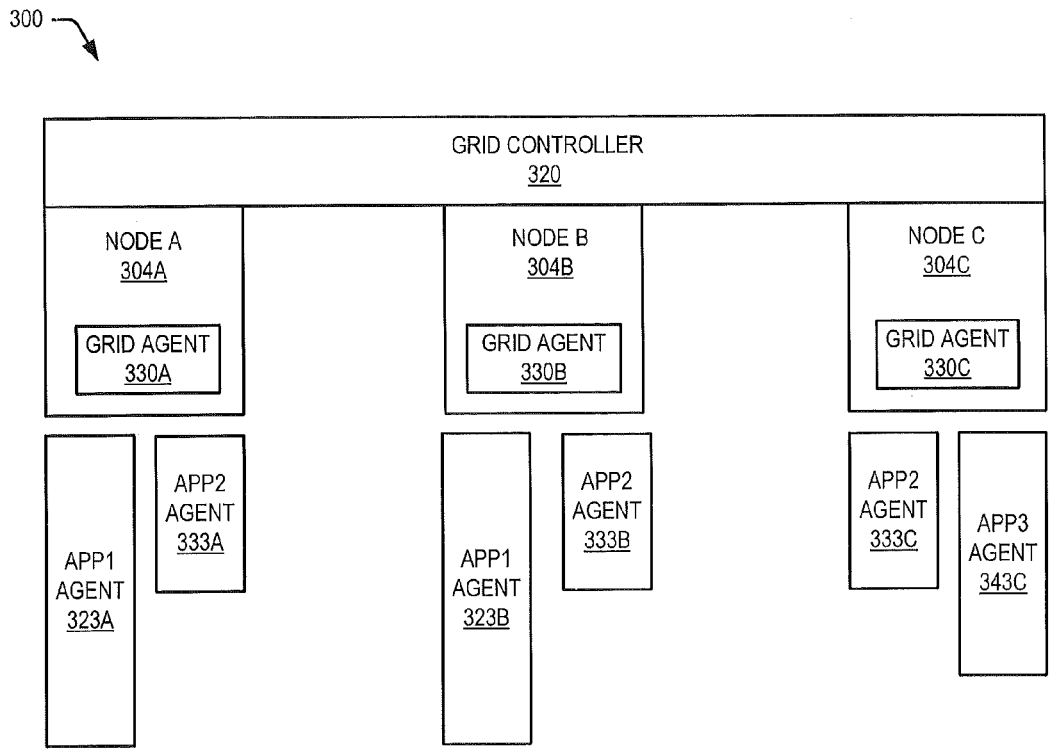
FIG. 3A is a block diagram illustrating a messaging infrastructure for a grid-based computing environment in accordance with an embodiment of the present disclosure.
FIG. 3B is a chart illustrating an example of a logical grouping of channels according to the embodiment of FIG. 3A.

FIG. 3A is a block diagram illustrating a messaging infrastructure for a grid-based computing environment or grid 300 in accordance with an embodiment of the present disclosure in greater detail. As shown in FIG. 3A, the computing environment 300 includes a grid controller 320, agents 330A-330C, 323A-323B, 333A-333B, and 343C installed on computing nodes 304A-304C, respectively, and channels for communication between the grid controller 320 and the agents 330A-330C, 323A-323B, 333A-333B, and 343C installed on the nodes 304A-304C.

Referring to FIG. 3A, the grid controller 320 is a full-featured interpreter, which can be used to write and execute scripts to control operation of the nodes 304A-304C of the grid 300. More particularly, the grid controller 320 may be configured to generate requests, which may be transmitted to the nodes 304A-304C for performance thereby. Requests transmitted using the grid controller 320 may be directly provided to a specific one of the nodes 304A-304C (for example, by providing the hostname of the node), or indirectly provided by transmitting the requests to the entire grid 300 to be fulfilled by one or more of the nodes 304A-304C having the desired capability, product, service, or other functionality.

In particular, as shown in FIG. 3A, each of the nodes 304A-304C in the grid 300 has a corresponding grid controller agent 330A-330C that communicates with the grid controller 320. Each of the grid controller agents 330A-330C may be configured to provide general information about its corresponding node to the grid controller 320. For example, the grid controller agents 330A-330C may be configured to transmit respective indications of the specific capabilities or functionalities provided by the corresponding nodes 304A-304C on which they are installed, which may be used by the grid controller 320 to register the nodes 304A-304C. The grid controller agents 330A-330C may also have the ability to self-update as needed.

Still referring to FIG. 3A, the nodes 304A-304C further include service agents 323A-323B, 333A-333B, and 343C, each of which is associated with a particular application or service that is provided by the node on which it is installed. In the example of FIG. 3A, agents 323A-323B are associated with a first application APP1 (for example, an Apache application), agents 333A-333C are associated with a second application APP2 (for example, an Integrated Threat Management (ITM) or other anti-virus application), and agent 343C is associated with a third application APP3 (for example, an Internet Information Services (IIS) application). More particularly, each of the service agents 323A-323B, 333A-333B, and 343C encapsulates a set of actions or functions for one of the applications/services provided by the node on which it is installed. For example, the service agents 323A-323B, 333A-333C, and 343C may provide functionality that allows the applications APP1, APP2, and APP3 to function as grid-enabled applications.

Accordingly, each of the agents 330A-330C, 323A-323B, 333A-333B, and 343C listens on the grid 300 and awaits instructions from a client (for example, a user or program). If an agent is associated with an application or other capability (provided by the node on which it is installed) that can respond to a request issued by the grid controller 320, it fulfills the request and provides results to the grid controller 320. Agents associated with applications or services that cannot fulfill the request may be configured to ignore the request. As noted above, requests can be made in several ways, including directly (to a single node) and indirectly (to all nodes). For example, the grid controller 320 may issue a request for a function 'uptime', which may be received by the grid controller agents 330A-330C of all registered nodes 304A-304C. The grid controller agents 330A-330C may thus determine and return the uptime for their respective nodes 304A-304C to the controller 320 in response. Alternatively or additionally, the grid controller 320 may issue a request for 'uptime (node A)', and only the agent 330A on node 304A will run the uptime command on Node A 304A and return the results to the controller 320. In addition, in some embodiments, a request can be made using a named transaction key, and results can be retrieved later, either in real-time or using the named transaction key.

The grid controller 320 ties all of the nodes 304A-304C on the grid 300 together. In some embodiments, the grid controller 320 leverages a ring type architecture by using a master ring node to find all other nodes. For example, when Node A 304A comes online, its grid controller agent 330A is designated as the master node hosting the grid controller 320. Subsequently, when Node B 304B comes online, its grid controller agent 330B specifies Node A 304A as the master for registration with the grid controller 320. Similarly, Node C 304C comes online and its grid controller agent 330C likewise specifies Node A 304A as the master when registering with the grid controller 320. Thus, the nodes 304B and 304C may be bootstrapped into the grid environment 300 and automatically registered by the grid controller 320 upon specifying Node A 304A as the master node. It will be understood, however, that the grid controller 320 may be run outside of the initial agent startup in some embodiments.

The grid controller 320 further provides facilities for the agents 330A-330C, 323A-323B, 333A-333B, and 343C to register with the infrastructure in accordance with embodiments of the disclosure. In the example shown in FIG. 3A, there are four types of agents: the grid controller agents 330A-330C, the APP1 agents 323A-323B, the APP2 agents 333A-333C, and the APP3 agent 343C. Each of the agents 330A-330C, 323A-323B, 333A-333B, and 343C includes computer program code that provides functions for the product or service with which that agent is associated. Examples of such functions can include enumerating service status, file management, or providing other information that a product/service might specifically require.

Communication channels are established to provide communication between the grid controller 320 and the agents 330A-330C, 323A-323B, 333A-333B, and 343C to carry out various types of operations on the grid 300. In some embodiments, the channels can be used to carry utility, administration and/or database requests. Utility requests may be used to instruct one or more of the applicable nodes 304A-304C to perform grid utility functions. Administration requests may allow for control over the applicable nodes 304A-304C for administrative functions, such as self-updates or adding users to one or more of the nodes 304A-304C. Database requests may be used to alter database configurations for or more of the applicable nodes 304A-304C.

In some embodiments, the grid controller 320 provides tuple spaces for peer-to-peer communication among the nodes 304A-304C. For example, respective data storage spaces in one or more of the nodes 304A-304C may be managed by the grid controller 320 to provide a shared data repository that is accessible to the agents 330A-330C, 323A-323B, 333A-333B, and 343C via the communication channels. As such, the agents 330A-330C, 323A-323B, 333A-333B, and/or 343C may pull an applicable request from the tuple space, perform the operation(s) specified by the request, and provide the result(s) to the source of the request and/or to the shared repository.

The grid controller 320 may further be configured to create logical groupings of similar resources, by registering nodes having agents associated with similar products/services or common functionalities/capabilities in respective channels. FIG. 3B illustrates an example of a logical grouping of channels according to the embodiment of FIG. 3A, where nodes having agents associated with a same application are registered in a same channel. As shown in FIG. 3B, nodes 304A and 304B, which include agents 323A and 323B associated with a same application APP1, are logically grouped and registered in a common channel CH1. Similarly, nodes 304A, 304B, and 304C, which include agents 333A, 333B, and 333C associated with a common application APP2, are logically grouped and registered in a same channel CH2. Likewise, node 304C, which includes an agent 343C associated with an application APP3, is registered in its own channel CH3. In some embodiments, the controller 320 may be configured to register the nodes by specifying a particular channel parameter in a startup configuration of each corresponding agent, and requests may be transmitted only to those nodes whose agents include the particular channel parameter. In other embodiments, the agents themselves may define the group(s)/channel(s) in which they wish to register (for example, based on one or more functionalities or services associated therewith), and the grid controller 320 may allow for differentiation of the channels.

The channels may thus allow separation of administrative domains for selective addressing. For example, in FIG. 3B, the controller 320 may be operable to 'set channel CH1'; thus, only Node A and Node B would receive subsequent requests from the controller 320. In other words, the channels provide a facility to logically group similar resources, such that specific requests may be selectively addressed to only the nodes registered with a particular channel, and nodes that are not registered with that channel (or otherwise not included in the logical grouping) do not receive the requests or otherwise do not respond to the requests. Thus, while all of the nodes 304A-304C are connected to each other via the network, not all of the nodes 304A-304C are required to process all issued requests.

Figure 4:
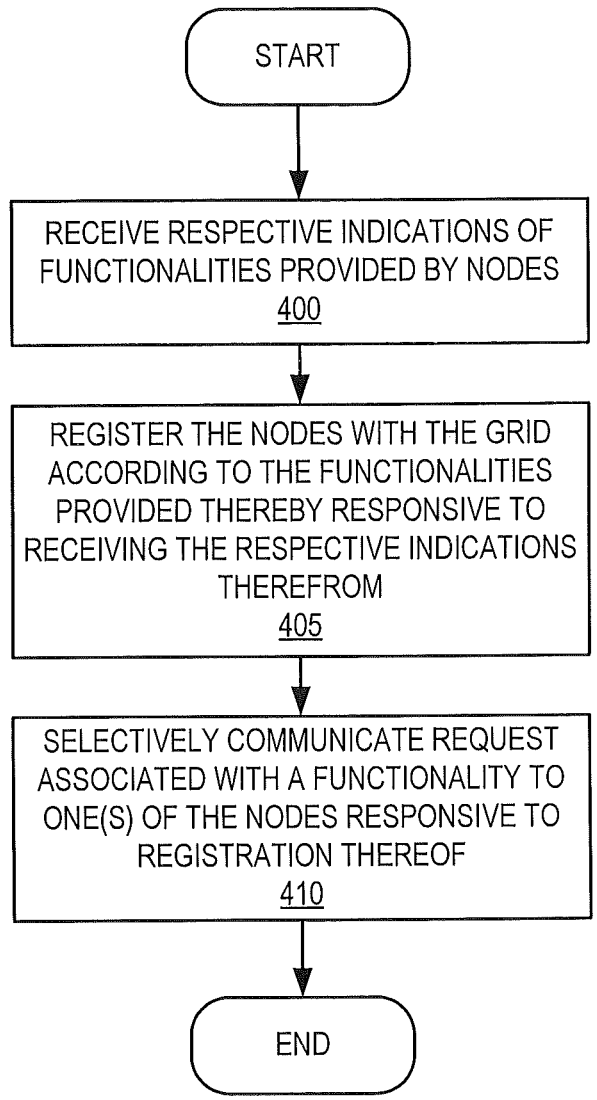
FIGS. 4-5 are flowcharts illustrating operations for providing a messaging infrastructure for communication between computing nodes in a distributed computing system and related components in accordance with an embodiment of the present disclosure.

FIG. 4 is a flowchart illustrating methods of communication between computing nodes in a distributed computing system according to an embodiment of the present disclosure. Referring now to FIG. 4, respective indications of applications, services, functionalities, or other capabilities provided by the computing nodes are received at block 400. For example, as shown in FIG. 3A, each of the computing nodes 304A-304C may include a grid controller agent 330A-330C, which may be configured to provide information about the service(s) provided by one or more applications running on its corresponding node to a grid controller 320 and/or to a shared data repository that is accessible to the grid controller agents 330A-330C and the grid controller 320. The nodes are thereby registered according to the services provided thereby responsive to receiving the respective indications therefrom at block 405. For example the grid controller 320 may receive the respective indications from the agents 330A-330C as to the services provided by each of the nodes 304A-304C, and may logically group the nodes 304A-304C in one or more channels CH1-CH3 in accordance with the respective services thereof, as shown in FIG. 3B.

Requests may thus be selectively communicated to ones of the nodes responsive to registration thereof at block 410. In particular, nodes 304A and 304B having agents 323A and 323B, which interface with an application APP1, may be logically grouped in a same channel CH1, and a request for a service provided by application APP1 may be selectively transmitted from the controller 320 to only the nodes 304A and 304B that include agents 323A and 323B for application APP1 using the channel CH1. As such, the request may not be transmitted to node 304C, which does not include an agent for application APP1, thereby avoiding unnecessary processing. Alternatively, the request for the service or functionality provided by application APP1 may be transmitted to all of the nodes 304A-304C (for example, via a shared data repository that is accessible to all of the agents 330A-330C, 323A-323B, 333A-333B, and/or 343C), and only the nodes 304A and 304B (having agents 323A and 323B that interface with application APP1) may respond to the controller 320, while the node 304C (which lacks an agent to interface with application APP1) may ignore the request.

Figure 5:
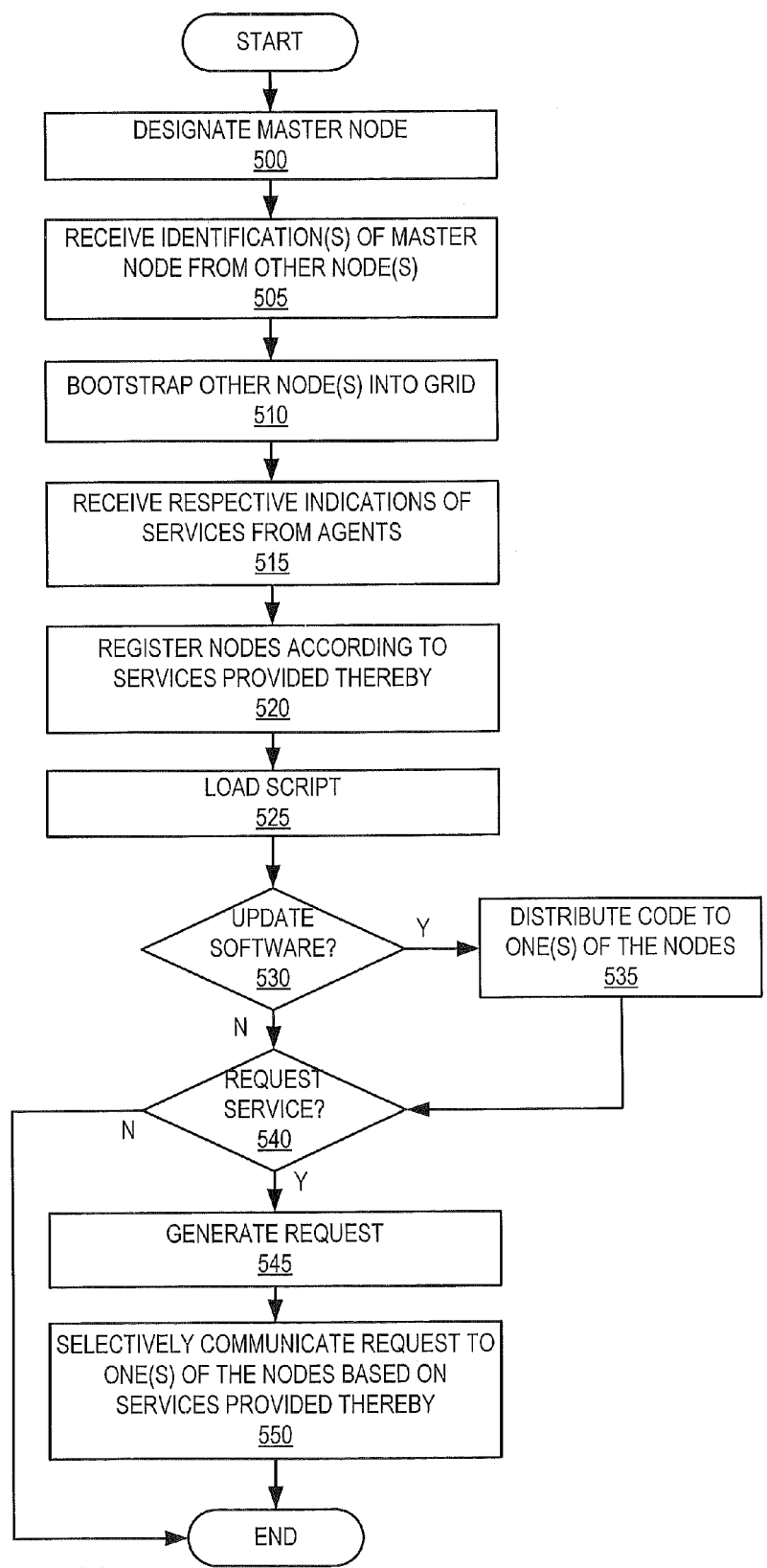

FIG. 5 is a flowchart illustrating methods of communication between computing nodes in a distributed computing system according to the embodiment of the FIG. 3A in greater detail. Referring now to FIGS. 3A and 5, one of the computing nodes 304A in the grid-based computing system 300 is designated as a master node at block 500. For example, the overlay network defined by the nodes 304A-304C may be based on a ring type architecture, and a first one of the nodes 304A that comes online may be designated as the master node based on communication with the grid controller 320 via its grid controller agent 330A. The master node 304A may provide initial configuration information for newly joining nodes, for example, via a shared data repository or tuple space that is accessible to the agents installed on each of the nodes 304A-304C.

At block 505, respective communications identifying the node 304A as the master node (for example, by IP address and port) are received from one or more of the computing nodes 304B-304C (for example, based on access to the shared data repository by their respective grid controller agents 330B and 330C), and the nodes 304B and 304C are bootstrapped into the grid-based computing system 300 in response at block 510. At block 515, respective indications of services provided by one or more applications hosted by each of the computing nodes 304A-304C are received (for example, at the shared data repository and/or the grid controller 320) from the respective agents 330A-330C, 323A-323B, 333A-333B, and/or 343C installed on the computing nodes 304A-304C, and the nodes 304A-304C are registered according to the services provided thereby at block 520. For example, ones of the nodes 304A-304C having similar or related functionalities may be logically grouped into a same one of the communication channels CH1-CH3, as shown in FIG. 3B.

Once the nodes 304A-304C have been registered, a script that is interpretable by the grid controller 320 is loaded and interpreted at block 525. The script may include computer readable program code requesting performance of an action associated with a particular service, and/or computer readable program code providing a software update (for example, to add and/or remove functionality) for one or more of the applications hosted by the nodes 304A-304C.

If it is determined that the script is related to a software update at block 530, the code for the software update is distributed to one or more of the computing nodes 304A-304C based on the services provided thereby at block 535. For example, the software update may be configured to add new functionality to ITM software, and thus, may be distributed only to the nodes 304B and 304C via communication channel CH2 based on the registration information provided by the agents 333B and 333C. Node functionality may similarly be removed by distributing the code to the desired nodes at block 535.

If it is determined that the script is associated with a request for performance of an action associated with a particular service at block 540, a request is generated responsive to interpreting the script at block 545. Based on the received indications of functionalities or services or other capabilities of the nodes 304A-304C, the request is selectively communicated to one or more of the nodes 304A-304C having the capability to respond to the request at block 550. For example, the grid controller 320 may indirectly communicate the requests to all of the nodes 304A-304C by posting the request in the shared data repository, and the agents associated with nodes having services capable of performing the request may retrieve the request by accessing the shared repository. Alternatively, the grid controller 320 may directly communicate the request to only a subset of the nodes that are configured to provide the requested service, via a communication channel in which those nodes are logically grouped. As such, respective responses (for example, including the results of performing the requested operations) may be received only from one or more of the nodes 304A-304C that host applications or services having the capability to perform the operation(s) specified in the request.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

That which is claimed:

1. A method for communication between computing nodes in a distributed computing system, the method comprising:

receiving, from the computing nodes, respective indications of functionalities provided thereby;

providing the respective indications of the functionalities to a shared data repository that is accessible to the computing nodes;

registering the computing nodes according to respective functionalities provided thereby responsive to receiving the respective indications therefrom;

selectively communicating a request associated with one of the functionalities to one of the computing nodes responsive to registration thereof by providing the request to ones of the computing nodes that provide the one of the functionalities; and receiving respective responses to the request from respective service agents installed in the ones of the computing nodes, wherein each of the service agents is associated with the one of the functionalities, and wherein the shared data repository is accessible to the respective service agents.

2. The method of claim 1, wherein providing the request comprises providing the request to the shared data repository for retrieval by the ones of the computing nodes.

3. The method of claim 1, wherein providing the request comprises:

logically grouping the ones of the computing nodes that provide the one of the functionalities in a same communication channel; and selectively addressing the request to the ones of the computing nodes that provide the one of the functionalities using the communication channel.

4. The method of claim 1, wherein the computing nodes comprise respective independently operable processing units, and wherein the request comprises one of a plurality of requests specifying respective tasks that collectively address a common goal.

5. A method for communication between computing nodes in a distributed computing system, the method comprising:

receiving, from the computing nodes, respective indications of functionalities provided thereby;

providing the respective indications of the functionalities to a shared data repository that is accessible to the computing nodes;

registering the computing nodes according to respective functionalities provided thereby responsive to receiving the respective indications therefrom; and selectively communicating a request associated with one of the functionalities to one of the computing nodes responsive to registration thereof, wherein selectively communicating comprises:

providing the request to ones of the computing nodes that provide the one of the functionalities by logically grouping the ones of the computing nodes that provide the one of the functionalities in a same communication channel, and selectively addressing the request to the ones of the computing nodes that provide the one of the functionalities using the communication channel, wherein logically grouping comprises:

populating respective configuration files of service agents installed in the ones of the computing nodes and associated with the one of the functionalities with a same channel parameter that indicates the communication channel, and wherein selectively addressing comprises:

transmitting the request to the service agents having the channel parameter in the respective configuration files thereof.

6. A method for communication between computing nodes in a distributed computing system, the method comprising:

receiving, from the computing nodes, respective indications of functionalities provided thereby;

providing the respective indications of the functionalities to a shared data repository that is accessible to the computing nodes;

registering the computing nodes according to respective functionalities provided thereby responsive to receiving the respective indications therefrom;

selectively communicating a request associated with one of the functionalities to one of the computing nodes responsive to registration thereof; and hosting, at one of the computing nodes, a grid controller for communication with respective agents installed in the computing nodes.

7. The method of claim 6, further comprising:

loading a script comprising computer readable program code that is interpretable by the grid controller; and generating the request responsive to interpreting the script.

8. The method of claim 7, wherein the computer readable code interpretable by the grid controller includes additional computer readable program code to provide an additional function that is different from the functionalities provided by the computing nodes, and wherein selectively communicating comprises:

distributing the additional computer readable program code to ones of the computing nodes responsive to interpretation of the computer readable program code by the grid controller, wherein the request comprises a request to perform the additional function.

9. A method for communication between computing nodes in a distributed computing system, the method comprising:

receiving, from the computing nodes, respective indications of functionalities provided thereby;

providing the respective indications of the functionalities to a shared data repository that is accessible to the computing nodes;

registering the computing nodes according to respective functionalities provided thereby responsive to receiving the respective indications therefrom; and selectively communicating a request associated with one of the functionalities to one of the computing nodes responsive to registration thereof, and further comprising:

designating one of the computing nodes as a master node;

receiving, from another of the computing nodes, a specification of the one of the computing nodes as the master node, wherein registering comprises registering the another of the computing nodes with the distributed computing system responsive to receiving the specification of the master node.

10. A computer program product for communication between computing nodes in a distributed computing system, comprising:

a computer readable storage medium having computer readable program code embodied in the medium, the computer readable program code comprising:

computer readable program code to provide respective indications of functionalities provided by the computing nodes to a shared data repository that is accessible to the computing nodes;

computer readable program code to register the computing nodes according to the functionalities provided thereby responsive to receipt of the respective indications therefrom;

computer readable program code to selectively communicate a request associated with one of the functionalities to one of the computing nodes responsive to registration thereof by providing the request to ones of the computing nodes that provide the one of the functionalities; and computer readable program code to receive respective responses to the request from respective service agents installed in the ones of the computing nodes, wherein each of the service agents is associated with the one of the functionalities, and wherein the shared data repository is accessible to the respective service agents.

11. The computer program product of claim 10, wherein the computer readable program code to provide the request comprises computer readable program code to provide the request to the shared data repository for retrieval by the ones of the computing nodes.

12. The computer program product of claim 10, wherein providing the request comprises:
computer readable program code to logically group the ones of the computing nodes that provide the one of the functionalities in a same communication channel; and
computer readable program code to selectively address the request to the ones of the computing nodes that provide the one of the functionalities using the communication channel.

13. A computer program product for communication between computing nodes in a distributed computing system, comprising:
a computer readable storage medium having computer readable program code embodied in the medium, the computer readable program code comprising:
computer readable program code to provide respective indications of functionalities provided thereby to a shared data repository that is accessible to the computing nodes;
computer readable program code to register the computing nodes according to the functionalities provided thereby responsive to receipt of the respective indications therefrom; and
computer readable program code to selectively communicate a request associated with one of the functionalities to one of the computing nodes responsive to registration thereof,
and further comprising:
computer readable program code to load a script comprising computer readable program code that is interpretable by a grid controller communicatively coupled to respective agents installed in the computing nodes; and
computer readable program code to generate the request responsive to interpreting the script.

14. A computer system, comprising:
at least one processor; and
at least one memory coupled to the at least one processor, the at least one memory comprising computer readable program code embodied therein that, when executed by the at least one processor, causes the at least one processor to:

provide respective indications of functionalities to a shared data repository that is accessible to the computing nodes;
register computing nodes in a distributed computing system according to the functionalities provided thereby responsive to receiving the respective indications therefrom;
selectively communicate a request associated with one of the functionalities to one of the computing nodes responsive to registration thereof by providing the request to ones of the computing nodes that provide the one of the functionalities,
wherein respective responses to the request are received from respective service agents installed in the ones of the computing nodes, wherein each of the service agents is associated with the one of the functionalities, and wherein the shared data repository is accessible to the respective service agents.

15. The computer system of claim 14, wherein the computer readable program code causes the at least one processor to provide the request to the shared data repository for retrieval by the ones of the computing nodes.

16. The computer system of claim 14, wherein the computer readable program code causes the at least one processor to:
logically group the ones of the computing nodes that provide the one of the functionalities in a same communication channel; and
selectively address the request to the ones of the computing nodes that provide the one of the functionalities using the communication channel.

17. The computer system of claim 14, wherein the computer readable program code causes the at least one processor to:
load a script comprising computer readable program code that is interpretable by a grid controller communicatively coupled to respective agents installed in the computing nodes; and
generate the request responsive to interpreting the script.

18. The computer system of claim 14, wherein the computing nodes comprise respective independently operable processing units, and wherein the request comprises one of a plurality of requests specifying respective tasks that collectively address a common goal.

* * * * *